(12) United States Patent
Wakabayashi et al.

(10) Patent No.: US 9,022,542 B2
(45) Date of Patent: May 5, 2015

(54) INK-JET PRINTING METHOD

(75) Inventors: Yuki Wakabayashi, Wakayama (JP); Ryuma Mizushima, Wakayama (JP)

(73) Assignee: Kao Corporation, Tokyo (JP)

( * ) Notice: Subject to any disclaimer, the term of this patent is extended or adjusted under 35 U.S.C. 154(b) by 42 days.

(21) Appl. No.: 13/391,179

(22) PCT Filed: Aug. 19, 2010

(86) PCT No.: PCT/JP2010/064003
§ 371 (c)(1),
(2), (4) Date: Feb. 17, 2012

(87) PCT Pub. No.: WO2011/021665
PCT Pub. Date: Feb. 24, 2011

(65) Prior Publication Data
US 2012/0147106 A1 Jun. 14, 2012
US 2014/0063155 A2 Mar. 6, 2014

(30) Foreign Application Priority Data

Aug. 19, 2009 (JP) ................................. 2009-190092

(51) Int. Cl.
*B41J 2/01* (2006.01)
*B41M 5/00* (2006.01)
*C09D 11/54* (2014.01)
*C09D 11/00* (2014.01)
*B41J 2/21* (2006.01)
*C09D 11/30* (2014.01)

(52) U.S. Cl.
CPC ............. *B41M 5/0011* (2013.01); *C09D 11/54* (2013.01); *C09D 11/005* (2013.01); *B41J 2/2114* (2013.01); *C09D 11/30* (2013.01)

(58) Field of Classification Search
CPC .......... B41J 2/01; B41J 2/2114; B41J 2/2107; B41J 11/0015; B41J 11/002; C09D 11/005; C09D 11/101; C09D 11/30; C09D 11/32; C09D 11/322; C09D 11/324; C09D 11/328; C09D 11/36; C09D 11/40; C09D 11/54; B41M 5/0011; B41M 5/0017

USPC ............. 347/95–102; 106/31.13, 31.27, 31.6; 523/160, 161
See application file for complete search history.

(56) References Cited

U.S. PATENT DOCUMENTS

| 5,747,016 | A | 5/1998 | Yui et al. | |
|---|---|---|---|---|
| 6,270,214 | B1 | 8/2001 | Smith et al. | |
| 2003/0064206 | A1* | 4/2003 | Koyano et al. | 428/195 |
| 2003/0215572 | A1* | 11/2003 | Nojiri et al. | 427/294 |
| 2005/0266185 | A1* | 12/2005 | Sekiya et al. | 428/32.39 |
| 2006/0098068 | A1* | 5/2006 | Hakamada et al. | 347/100 |
| 2010/0295891 | A1* | 11/2010 | Goto et al. | 347/21 |

FOREIGN PATENT DOCUMENTS

| JP | 7-133352 | A | 5/1995 |
|---|---|---|---|
| JP | 8-142500 | A | 6/1996 |
| JP | 2004-83693 | A | 3/2004 |

OTHER PUBLICATIONS

International Search Report for PCT/JP2010/064003, mailed on Sep. 28, 2010.
Machine English translation for JP-2004-83693-A dated Mar. 18, 2004.
Machine English translation for JP-8-142500-A dated Jun. 4, 1996.

* cited by examiner

*Primary Examiner* — Matthew Luu
*Assistant Examiner* — Rut Patel
(74) *Attorney, Agent, or Firm* — Birch, Stewart, Kolasch & Birch, LLP

(57) ABSTRACT

The present invention relates to [1] an ink-jet printing method including the steps of applying an ink (A) having a static surface tension of from 23 to 70 mN/m and containing a poly(N-acylalkylene imine)-modified silicone and a cationic polymer onto a recording medium, and then applying by ink-jet printing, a water-based ink (B) onto the recording medium; [2] a recording paper for ink-jet printing which is obtainable by applying an ink (A) having a static surface tension of from 23 to 70 mN/m and containing a poly(N-acylalkylene imine)-modified silicone and a cationic polymer onto a recording medium; and [3] a water-based ink set including an ink (A) having a static surface tension of from 23 to 70 mN/m and containing a poly(N-acylalkylene imine)-modified silicone and a cationic polymer, and a water-based ink (B) containing an anionic colorant.

9 Claims, No Drawings

INK-JET PRINTING METHOD

FIELD OF THE INVENTION

The present invention relates to an ink-jet printing method, a recording paper for ink-jet printing, and a water-based ink set used in the ink-jet printing method.

BACKGROUND OF THE INVENTION

In ink-jet printing methods, droplets of ink are directly projected onto a recording medium from very fine nozzles and allowed to adhere to the recording medium to form characters or images. The ink-jet printing methods have been rapidly spread because of their various advantages such as easiness of full coloration, low costs, capability of using a plain paper as the recording medium, non-contact with printed images or characters, etc.

However, in the ink-jet printing methods, since a solution or dispersion of a colorant containing a large amount of a solvent is ejected as an ink for printing on a recording medium such as papers, there tends to occur such a problem that especially when using a water-based ink as the printing ink, the ink is penetrated and spread along fibers in the papers to thereby cause deterioration in clarity of images printed, etc., as compared to the other printing methods.

To solve the above problems, there has been proposed the method in which a recording medium such as papers is previously subjected to the treatment for insolubilizing a colorant applied thereonto, etc.

For example, Patent Document 1 discloses a method for forming color images in which after applying a colorless liquid composition containing a silicone compound and a cationic compound onto a recording medium, an ink containing an anionic group-containing dye, etc., is applied and attached onto the recording medium in an ink-jetting manner, for the purpose of improving an optical density of printed images on plain papers, ink bleeding, a color reproducibility or the like.

Patent Document 2 discloses an oil-based ink for stamp pads which contains a poly(N-acylalkylene imine)-modified silicone, a colorant and a solvent, for the purpose of improving a repellency and adhesion of the ink.

In addition, Patent Document 3 discloses an ink-jet printing method in which after applying a treating solution containing a treating material selected from a block or graft copolymer produced from a dialkyl siloxane and a polar hydrophilic monomer, an organopolysiloxane copolymer, etc., onto a recording medium, an ink composition containing water and a colorant is loaded in an ink-jet printer, and then ink droplets are ejected onto the recording medium to obtain printed images thereon.

Patent Document 1: JP 8-142500A
Patent Document 2: JP 2004-83693A
Patent Document 3: U.S. Pat. No. 6,270,214

SUMMARY OF THE INVENTION

The present invention relates to the following aspects [1] to [3].

[1] An ink-jet printing method including the steps of applying an ink (A) having a static surface tension of from 23 to 70 mN/m and containing a poly(N-acylalkylene imine)-modified silicone and a cationic polymer onto a recording medium; and then applying by ink-jet printing, a water-based ink (B) onto the recording medium.

[2] A recording paper for ink-jet printing which is obtainable by applying an ink (A) having a static surface tension of from 23 to 70 mN/m and containing a poly(N-acylalkylene imine)-modified silicone and a cationic polymer onto a recording medium.

[3] A water-based ink set comprising an ink (A) having a static surface tension of from 23 to 70 mN/m and containing a poly(N-acylalkylene imine)-modified silicone and a cationic polymer, and a water-based ink (B) containing an anionic colorant.

DETAILED DESCRIPTION OF THE INVENTION

Conventionally, the recording medium used in ink-jet printing has been treated with a treating agent having a polarity reverse to that of an ink to be used therein, etc., as described in Patent Document 1. However, the thus treated recording medium tends to be still insufficient in effect of improving an optical density, an image clarity, etc., of images printed thereon, and further tends to be insufficient in the effect of preventing penetration of the ink to a backside thereof, i.e., preventing occurrence of so-called strike-through of the ink.

The present invention relates to an ink-jet printing method in which even when printed on a plain paper, the resulting printed images have a high optical density while forming ink dots having a round shape upon printing, and can exhibit an excellent image clarity and a high image quality without occurrence of severe strike-through, a recording paper for ink-jet printing, and a water-based ink set.

The reason why even when a recording paper for ink-jet printing is treated with a treating agent having a polarity reverse to that of an ink to be used therein, it is not possible to obtain printed images having a sufficient optical density and a sufficient image clarity and fully prevent occurrence of strike-through, is considered by the present inventors as follows. That is, it is considered that the ink is allowed to penetrate through the recording paper before the ink is sufficiently interacted with the treating agent having a reverse polarity, etc. As a result of intensive studies based on the above consideration, the present inventors have found that when previously applying an ink containing a poly(N-acylalkylene imine)-modified silicone and a cationic polymer onto the recording medium, it is possible to prevent excessive penetration or spread of the ink, improve an optical density and an image clarity of the obtained printed images as well as a roundness of ink dots, and further prevent occurrence of strike-through.

That is, the present invention relates to the following aspects [1] to [3].

[1] An ink-jet printing method including the steps of applying an ink (A) having a static surface tension of from 23 to 70 mN/m and containing a poly(N-acylalkylene imine)-modified silicone and a cationic polymer onto a recording medium; and then applying by ink-jet printing, a water-based ink (B) onto the recording medium.

[2] A recording paper for ink-jet printing which is obtainable by applying an ink (A) having a static surface tension of from 23 to 70 mN/m and containing a poly(N-acylalkylene imine)-modified silicone and a cationic polymer onto a recording medium.

[3] A water-based ink set including an ink (A) having a static surface tension of from 23 to 70 mN/m and containing a poly(N-acylalkylene imine)-modified silicone and a cationic polymer, and a water-based ink (B) containing an anionic colorant.

[Ink-Jet Printing Method]

In the ink-jet printing method according to the present invention, after applying an ink (A) having a static surface tension of from 23 to 70 mN/m and containing a poly(N-acylalkylene imine)-modified silicone and a cationic polymer onto a recording medium, a water-based ink (B) is applied by ink-jet printing, onto the recording medium.

According to the ink-jet printing method of the present invention, it is possible to obtain high-quality printed images which have a high optical density, are excellent in roundness of ink dots and image clarity, and hardly suffer from strike-through of the ink. The reason therefor is considered as follows although it is not clearly determined.

In general, upon ink-jet printing, ink dots adhering onto a surface of a recording paper such as a plain paper is allowed to spread in the direction of fibers over a surface of the paper, resulting in occurrence of irregular bleeding and therefore deterioration in roundness of the ink dots. In addition, the ink may also penetrate to an inside of the recording paper, so that strike-through of the ink tends to be caused. When using a water-based ink, these phenomena are likely to occur more remarkably because the water-based ink tends to be hardly evaporated.

In the present invention, after the ink (A) containing a poly(N-acylalkylene imine)-modified silicone having an adequate ink-repellent property is allowed to be previously present on the recording paper. Thus, in the case where the ink (A) is first applied on the recording paper and then the water-based ink (B) is applied thereonto, droplets of the ink (B) ejected from nozzles of a printing head can be attached onto a coating layer of the poly(N-acylalkylene imine)-modified silicone formed on a surface of the recording paper. At this time, since the modified silicone coating layer has an ink-repellent property, the ink droplets attached thereonto are prevented from spreading in the direction of fibers on the surface of the recording paper and penetrating toward an inside of the recording paper. While keeping a shape of the respective ink dots remaining in the vicinity of the surface of the recording paper, only an aqueous medium component of the ink is allowed to gradually penetrate to an inside of the recording paper or evaporate therefrom. As a result, it is considered that the thus obtained ink dots exhibit an excellent roundness, and it is also possible to obtain high-quality printed images which are excellent in optical density and image clarity and free from occurrence of severe strike-through. The poly(N-acylalkylene imine)-modified silicone has a grafted structure having a specific side chain and exhibits a strong self-agglomerating property. For these reasons, the poly(N-acylalkylene imine)-modified silicone is capable of controlling a surface tension of the ink even though it is a kind of silicone. Thus, it is considered that by controlling a surface tension of the ink (A) to a specific value, the ink (B) subsequently attached onto the surface of the recording paper can be prevented from penetrating through the recording paper and spreading over the surface thereof to thereby obtain high-quality printed images.

Further, it is considered that by incorporating the cationic polymer in the ink (A), the water-based ink (B) subsequently applied is prevented from penetrating through the recording paper, and further allowed to remain in the vicinity of the surface of the recording paper and electrostatically interact with the ink (A) to form an agglomerate therewith, which results in formation of printed images having a still higher quality.

Meanwhile, it is required that the ink (A) contains the poly(N-acylalkylene imine)-modified silicone and the cationic polymer as essential components, but it is not necessarily required that the ink (A) contains a colorant. Therefore, the ink (A) containing no colorant is to be referred to as a treating solution (A).

In the following, the respective components used in the present invention are explained.

<Ink (A)>

The ink (A) used in the present invention has a static surface tension of from 23 to 70 mN/m, and contains the poly(N-acylalkylene imine)-modified silicone and the cationic polymer.

[Poly(N-Acylalkylene Imine)-Modified Silicone]

The poly(N-acylalkylene imine)-modified silicone is preferably in the form of an organopolysiloxane in which a poly (N-acylalkylene imine) segment (y) containing a repeating unit represented by the following general formula (1) (hereinafter occasionally referred to merely as a "segment (y)") is bonded to at least one silicon atom of an organopolysiloxane segment (x) (hereinafter occasionally referred to merely as a "segment (x)") through a hetero atom-containing alkylene group, although not particularly limited thereto.

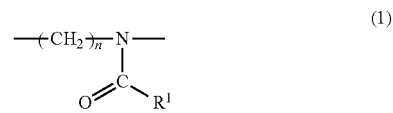

wherein $R^1$ is a hydrogen atom, an alkyl group having 1 to 22 carbon atoms, an aryl group having 6 to 22 carbon atoms, or an arylalkyl group or alkylaryl group having 7 to 22 carbon atoms; and n is a number of 2 or 3.

The poly(N-acylalkylene imine)-modified silicone is especially preferably an organopolysiloxane in which the segment (y) is bonded to at least one silicon atom present in a terminal end or a side chain of the segment (x) through the hetero atom-containing alkylene group.

The weight ratio of the segment (x) to the segment (y) [(x)/(y)] in the poly(N-acylalkylene imine)-modified silicone is preferably from 5/95 to 99/1, more preferably from 20/80 to 96/4 and still more preferably from 30/70 to 90/10 from the viewpoints of enhancing an optical density and an image clarity and preventing occurrence of strike-through.

The weight-average molecular weight of the poly(N-acylalkylene imine)-modified silicone is preferably from 10,000 to 5,000,000, more preferably from 20,000 to 1,000,000, still more preferably from 50,000 to 1,000,000 and further still more preferably from 50,000 to 200,000 from the viewpoints of enhancing an optical density and an image clarity and preventing occurrence of strike-through. Meanwhile, the weight-average molecular weight may be measured by the method described in Examples below.

Examples of the organopolysiloxane forming the segment (x) include those compounds represented by the following general formula (2).

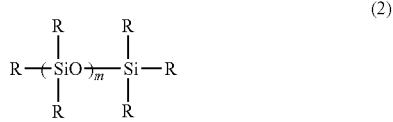

wherein R is an alkyl group having 1 to 22 carbon atoms, a phenyl group or a hetero atom-containing alkyl group, and a plurality of the R groups may be the same or different from each other but at least one of the R groups is the hetero atom-containing alkyl group; and m is a number of 100 to 5000.

In the general formula (2), the alkyl group having 1 to 22 carbon atoms which is represented by R is preferably an alkyl group having 1 to 12 carbon atoms, more preferably an alkyl group having 1 to 3 carbon atoms, and still more preferably a methyl group.

Examples of the hetero atom-containing alkyl group which is represented by R include alkyl groups having 2 to 20 carbon atoms which contain at least one hetero atom and preferably 1 to 3 hetero atoms selected from the group consisting of a nitrogen atom, an oxygen atom and a sulfur atom. The hetero atom-containing alkyl group may be bonded to at least one silicon atom present in a terminal end or a side chain of the organopolysiloxane. The number of the hetero atom-containing alkyl groups contained in the organopolysiloxane is preferably from 1 to 300 and more preferably from 1 to 100.

Examples of the suitable hetero atom-containing alkyl group include the following groups.

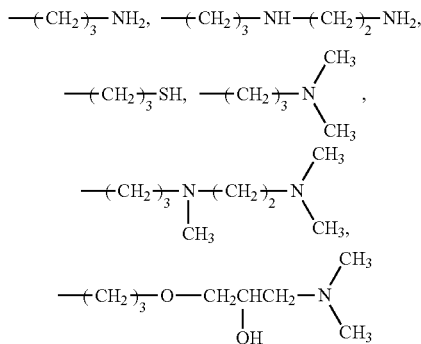

In the above general formula (2), m is preferably a number of from 100 to 2000 and more preferably from 350 to 1500.

The weight-average molecular weight of the organopolysiloxane forming the segment (x) is preferably from 1,000 to 1,000,000, more preferably from 10,000 to 500,000 and still more preferably from 20,000 to 200,000. The weight-average molecular weight may be measured by the method described in Examples below.

The segment (y) is a poly(N-acylalkylene imine) segment constituted of a repeating unit represented by the following general formula (1).

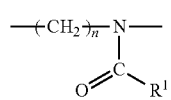

wherein $R^1$ is a hydrogen atom, an alkyl group having 1 to 22 carbon atoms, an aryl group having 6 to 22 carbon atoms, or an arylalkyl group or alkylaryl group having 7 to 22 carbon atoms; and n is a number of 2 or 3.

The alkyl group as $R^1$ is preferably an alkyl group having 1 to 12 carbon atoms and more preferably an alkyl group having 1 to 3 carbon atoms. Specific examples of the alkyl group having 1 to 3 carbon atoms include a methyl group, an ethyl group, an n-propyl group and an isopropyl group. Specific examples of the aryl group include a phenyl group and a naphthyl group. Specific examples of the arylalkyl group include a phenylalkyl group and a naphthylalkyl group in which the alkyl group has 1 to 20 carbon atoms. Specific examples of the alkylaryl group include an alkylphenyl group and an alkylnaphthyl group in which the alkyl group has 1 to 20 carbon atoms.

The polymerization degree of the repeating unit represented by the general formula (1) is not particularly limited, and, for example, is preferably from 1 to 500 and more preferably from 6 to 100.

Examples of the hetero atom-containing alkylene group through which the segment (x) and the segment (y) are bonded to each other include alkylene groups having 2 to 20 carbon atoms which contain at least one hetero atom and more preferably 1 to 3 hetero atoms selected from the group consisting of a nitrogen atom, an oxygen atom and a sulfur atom. Specific examples of the hetero atom-containing alkylene group include alkylene groups having 2 to 20 carbon atom which contain, between adjacent carbon atoms of an alkylene chain and/or at a terminal end of the alkylene chain, at least one substance selected from the group consisting of (i) a secondary amine or a tertiary amine, (ii) an ammonium salt obtained by adding $H^+$ to a secondary amine or a tertiary amine, (iii) a quaternary ammonium salt, (iv) an oxygen atom and (v) a sulfur atom.

Examples of the suitable alkylene group having 2 to 20 carbon atoms include those groups represented by the following structural formulae.

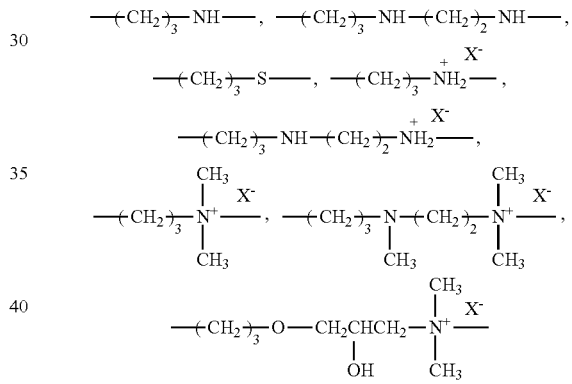

In the above structural formulae, $X^-$ represents an organic anion as a counter ion of an ammonium salt. Specific examples of $X^-$ include halogen ions such as chlorine, iodine and bromine, and organic anions derived from methosulfate, ethosulfate, methophosphate, ethophosphate, alkyl carboxylates or the like.

The poly(N-acylalkylene imine)-modified silicone used in the present invention may be obtained, for example, by the method of reacting a poly(N-acylalkylene imine) as a ring-opened polymer of a cyclic iminoether with an organopolysiloxane forming the segment (x). More specifically, the poly(N-acylalkylene imine)-modified silicone may be obtained by the method described in paragraphs [0034] to [0042] of JP 7-133352A.

The poly(N-acylalkylene imine)-modified silicone may be either a single compound or a mixture of compounds.

[Cationic Polymer]

The ink (A) used in the present invention contains the cationic polymer in addition to the poly(N-acylalkylene imine)-modified silicone.

The term "cationic" in the cationic polymer as used herein means that when an unneutralized compound is dispersed or dissolved in pure water in an amount of 1% by weight based on the pure water, a pH value of a supernatant liquid of the resulting dispersion or a pH value of the resulting solution as measured at 20° C. becomes more than 7; that when a compound containing a quaternary ammonium salt, etc., is dispersed or dissolved in pure water such that a counter ion thereof is a hydroxide ion, a pH value of a supernatant liquid of the resulting dispersion or a pH value of the resulting solution as measured at 20° C. becomes more than 7; or that when a pH value of a dispersion or solution of a compound, etc., is not clearly determined because the compound, etc., is insoluble in water, a zeta potential of a dispersion prepared by dispersing the compound, etc., in pure water is a positive value.

The weight-average molecular weight of the cationic polymer is preferably from 1,500 to 100,000, more preferably from 2,000 to 50,000 and still more preferably from 2,500 to 30,000 from the viewpoints of enhancing an optical density and an image clarity and preventing occurrence of strike-through.

As the cationic polymer, preferred are those polymers having a cationic group such as a primary, secondary or tertiary amine group, an imino group, a quaternary ammonium salt group and a hydrazine group, and more preferred are those polymers having a quaternary ammonium salt group. These polymers are preferably in the form of a homopolymer of a cationic group-containing monomer, or a copolymer or polycondensate of the cationic group-containing monomer with the other monomer.

In addition, the cationic polymer is preferably a water-soluble polymer from the viewpoints of efficiently reacting with colorant-containing anionic polymer particles and enhancing an optical density of the resulting printed images. The water-soluble polymer as used herein means such a cationic polymer having a solubility in water of more than 10 g when the cationic polymer is dried at 105° C. for 2 h until reaching a constant weight thereof and then dissolved in 100 g of water at 25° C. The solubility in water of the cationic polymer is more preferably 15 g or more, still more preferably 20 g or more, and further still more preferably 100 g or more.

Specific examples of the cationic polymer include polyethyleneimine, polyallylamine, polyvinylamine, poly(diallyldimethyl ammonium chloride), polyvinyl pyridine, a reaction product of polyethyleneimine and epichlorohydrin, a polyamide-polyamine resin, a polyamide-epichlorohydrin resin, chitosan, cationized starches, polyamine sulfone, polyvinyl imidazole, polyamidine, a condensate of dicyanamide and polyalkylene polyamine, a condensate of polyalkylene polyamine and a dicyandiamide ammonium salt, a condensate of dicyandiamide and formalin, a polycondensate of epichlorohydrin and dialkylamine, a copolymerized product of diallyldimethyl ammonium chloride with $SO_2$, a vinyl pyrrolidone-vinyl imidazole copolymer, a vinyl benzyl trimethyl ammonium salt polymer, poly(dimethylaminoethyl methacrylate), poly(methacryloyloxyethyl trimethyl ammonium salt), and poly(diallyldimethyl ammonium salt).

Among these cationic polymers, preferred are those polymers containing a constitutional unit derived from at least one compound selected from the group consisting of dimethylaminoethyl methacrylate and a methacryloyloxyethyl trimethyl ammonium salt, a poly(diallyldimethyl ammonium salt) and polyethyleneimine. The amino group-containing polymers are preferably used after they are neutralized with an acid.

The above cationic polymers may be used alone or in combination of any two or more thereof.

[Composition of Ink (A)]

The content of the poly(N-acylalkylene imine)-modified silicone in the ink (A) used in the present invention is preferably from 0.5 to 10.0% by weight, more preferably from 1.0 to 7.0% by weight and still more preferably from 2.0 to 5.0% by weight.

The content of the cationic polymer in the ink (A) used in the present invention is preferably from 0.01 to 25% by weight, more preferably from 1 to 15% by weight, still more preferably from 3 to 10% by weight, and further still more preferably from 4 to 9% by weight.

The weight ratio of the poly(N-acylalkylene imine)-modified silicone to the cationic polymer [poly(N-acylalkylene imine)-modified silicone/cationic polymer] in the ink (A) is preferably from 1/10 to 100/10, more preferably from 1/10 to 50/10, still more preferably from 2/10 to 50/10, further still more preferably from 2/10 to 20/10, and especially preferably from 5/10 to 20/10.

In addition, the content of water in the ink (A) is preferably from 20 to 90% by weight, more preferably from 30 to 80% by weight, and still more preferably from 40 to 70% by weight.

The ink (A) used in the present invention may contain various components ordinarily used in water-based inks such as organic solvents, dispersants, surfactants, viscosity modifiers, defoaming agents, antiseptic agents, mildew-proof agents and rust preventives.

Examples of the organic solvents include polyols such as ethylene glycol, polyethylene glycol and glycerol. Among these organic solvents, preferred is polyethylene glycol.

The ink (A) used in the present invention preferably contains substantially no colorant, i.e., is preferably clear ink, colorless ink or transparent ink. More specifically, the content of the colorant in the ink (A) is preferably 1% by weight or less, more preferably 0.1% by weight or less, and still more preferably 0.01% by weight or less. It is also preferred that the ink (A) contain no colorant. When using the ink (A) containing substantially no colorant, the hue of the water-based ink (B) is free from adverse influence by the ink (A) when the ink (B) is printed over the ink (A).

The static surface tension of the ink (A) used in the present invention (as measured at 20° C.) is from 23 to 70 mN/m, preferably from 30 to 70 mN/m, more preferably from 35 to 70 mN/m, still more preferably from 40 to 70 mN/m and further still more preferably from 40 to 50 mN/m from the viewpoints of enhancing an image clarity and an optical density as well as roundness of ink dots, and preventing occurrence of strike-through.

Meanwhile, the static surface tension may be measured by the method described in Examples below.

The viscosity of the ink (A) (as measured at 20° C.) is preferably from 2 to mPa·s, more preferably from 2.5 to 16 mPa·s, and still more preferably from 2.5 to 12 mPa·s.

<Water-Based Ink (B)>

The water-based ink (B) used in the present invention preferably contains an anionic colorant.

[Anionic Colorant]

The anionic colorant is not particularly limited. As the anionic colorant, there may be used an anionic water-soluble dye, anionic colorant particles, etc. Among these anionic colorants, anionic colorant particles are preferably used from the viewpoints of enhancing an optical density and an image clarity and preventing occurrence of strike-through.

The term "anionic" as used herein means that when an unneutralized substance is dispersed or dissolved in pure water in an amount of 1% by weight based on the pure water, a pH value of a supernatant liquid of the resulting dispersion or a pH value of the resulting solution as measured at 20° C. becomes less than 7, or that when the substance is insoluble in pure water and therefore a pH value thereof is not clearly determined, a zeta potential of a dispersion prepared by dispersing the substance in pure water becomes a negative value.

The anionic colorant particles are not particularly limited. There may be used dispersions prepared by dispersing a colorant such as pigment and hydrophobic dye in an ink using an anionic surfactant or an anionic polymer, and anionic self-dispersible pigments, etc. Among them, preferred are anionic self-dispersible pigments and colorant-containing anionic polymer particles, and more preferred are colorant-containing anionic polymer particles.

Meanwhile, in the present invention, when referred to merely as a "colorant", the colorant means a pigment, a dye, etc., and may also include an anionic water-soluble dye, an anionic self-dispersible pigment, etc.

The average particle size of the anionic colorant particles is preferably from 40 to 200 nm, more preferably from 50 to 150 nm and still more preferably from 60 to 100 nm from the viewpoint of a high optical density.

The average particle size of the anionic colorant particles may be measured by a dynamic light scattering method, more specifically, by the method described in Examples below.

As the colorant contained in the anionic colorant particles, there may be used any of a pigment, a hydrophobic dye, etc. Among these colorants, preferred is the pigment.

The pigment may be either organic or inorganic. The organic or inorganic pigment may be used in combination with an extender pigment, if required.

Examples of the inorganic pigment include carbon blacks, metal oxides or the like. Among these inorganic pigments, carbon blacks are preferably used especially for black inks. The carbon blacks may include furnace blacks, thermal lamp blacks, acetylene blacks and channel blacks.

Examples of the organic pigment include azo pigments, diazo pigments, phthalocyanine pigments, quinacridone pigments, isoindolinone pigments, dioxazine pigments, perylene pigments, perinone pigments, thioindigo pigments, anthraquinone pigments, and quinophthalone pigments.

The hue of these pigments is not particularly limited, and there may be used any of pigments having a chromatic color such as a red, a yellow, a blue, an orange and a green.

Specific examples of the preferred organic pigments include one or more pigments selected from the group consisting of C.I. Pigment Yellow, C.I. Pigment Red, C.I. Pigment Orange, C.I. Pigment Violet, C.I. Pigment Blue, C.I. Pigment Orange and C.I. Pigment Green with various product numbers. Among these organic pigments, quinacridone-based pigments are more preferred from the viewpoint of a good color development.

In addition, there may also be suitably used solid solution pigments such as quinacridone solid solution pigments. The quinacridone solid solution pigments are constituted from an unsubstituted quinacridone of β-type, γ-type, etc., and 2,9-dimethyl quinacridone (C.I. Pigment Red 122), or from an unsubstituted quinacridone of β-type, γ-type, etc., and a dichloroquinacridone such as 2,9-dichloroquinacridone, 3,10-dichloroquinacridone and 4,11-dichloroquinacridone. A more preferred quinacridone solid solution pigment is a solid solution pigment including combination of an unsubstituted quinacridone (C.I. Pigment Violet 19) and 2,9-dichloroquinacridone (C.I. Pigment Red 202).

These pigments may be used alone or in the form of a mixture containing any two or more thereof at an optional ratio.

The anionic colorant particles are preferably in the form of an anionic self-dispersible type pigment. The "self-dispersible pigment" as used herein means a pigment onto a surface of which one or more hydrophilic functional groups (including an anionic hydrophilic group such as a carboxyl group and a sulfonic group or a cationic hydrophilic group such as a quaternary ammonium group) are bonded either directly or through the other atom group to thereby render the pigment dispersible in an aqueous medium without using a surfactant or a resin. Examples of the other atom group include an alkanediyl group having 1 to 12 carbon atoms, a phenylene group and a naphthylene group. When using the anionic colorant particles, the hydrophilic functional group contained therein is preferably an anionic hydrophilic group such as a carboxyl group and a sulfonic group. In order to render the pigment self-dispersible, there may be used, for example, the method of chemically bonding a necessary amount of the hydrophilic functional group to the surface of the pigment by an ordinary method.

[Colorant-Containing Anionic Polymer Particles]

The anionic colorant particles are preferably in the form of colorant-containing anionic polymer particles.

[Anionic Polymer]

The anionic polymer used in the anionic polymer particles is preferably a water-insoluble polymer from the viewpoint of enhancing an optical density of a water dispersion and an ink. The "water-insoluble polymer" as used herein means a polymer which exhibits a solubility in water of 10 g or less when the polymer is dried at 105° C. for 2 h until reaching a constant weight thereof and then dissolved in 100 g of water at 25° C. The solubility in water of the water-insoluble polymer is preferably 5 g or less and more preferably 1 g or less. The solubility in water of the anionic polymer means a solubility thereof as measured when an anionic group contained in the anionic polymer is completely (100%) neutralized with sodium hydroxide.

Examples of the anionic polymer used above include polyesters, polyurethanes and vinyl-based polymers. Among these polymers, from the viewpoint of a good storage stability of the resulting ink, preferred are those vinyl-based polymers obtained by addition-polymerization of vinyl monomers.

The anionic vinyl-based polymer used in the present invention is preferably a vinyl-based polymer which is produced by copolymerizing a monomer mixture containing (a) an anionic monomer (hereinafter occasionally referred to merely as a "component (a)") and (b) a hydrophobic monomer (hereinafter occasionally referred to merely as a "component (b)") (hereinafter occasionally referred to merely as a "monomer mixture"). The vinyl-based polymer contains a constitutional unit derived from the component (a) and a constitutional unit derived from the component (b). The vinyl-based polymer preferably contains, in addition to the constitutional unit derived from the component (a) and the constitutional unit derived from the component (b), a constitutional unit derived from (c) a macromer (hereinafter occasionally referred to merely as a "component (c)").

[(a) Anionic Monomer]

The anionic monomer (a) is used as a monomer component of the anionic polymer for stably dispersing the colorant-containing anionic polymer particles in an ink.

Examples of the anionic monomer include a carboxylic acid monomer, a sulfonic acid monomer and a phosphoric acid monomer.

Specific examples of the carboxylic acid monomer include acrylic acid, methacrylic acid, crotonic acid, itaconic acid, maleic acid, fumaric acid, citraconic acid and 2-methacryloyloxymethylsuccinic acid.

Specific examples of the sulfonic acid monomer include styrenesulfonic acid, 2-acrylamido-2-methylpropanesulfonic acid, 3-sulfopropyl(meth)acrylate and bis(3-sulfopropyl)itaconic acid ester.

Specific examples of the phosphoric acid monomer include vinylphosphonic acid, vinyl phosphate, bis(methacryloxyethyl)phosphate, diphenyl-2-acryloyloxyethyl phosphate, diphenyl-2-methacryloyloxyethyl phosphate and dibutyl-2-acryloyloxyethyl phosphate.

Among the above anionic monomers, in view of a good dispersion stability of the anionic polymer particles in the resulting ink, preferred are the carboxylic acid monomers, and more preferred are acrylic acid and methacrylic acid.

[(b) Hydrophobic Monomer]

The hydrophobic monomer (b) is used as a monomer component of the anionic polymer for enhancing an optical density of a water dispersion and an ink. Examples of the hydrophobic monomer include alkyl(meth)acrylates and aromatic group-containing monomers.

The preferred alkyl(meth)acrylates are those alkyl(meth)acrylates containing an alkyl group having 1 to 22 carbon atoms and preferably 6 to 18 carbon atoms. Examples of the alkyl(meth)acrylates include methyl(meth)acrylate, ethyl(meth)acrylate, (iso)propyl(meth)acrylate, (iso- or tertiary-)butyl(meth)acrylate, (iso)amyl(meth)acrylate, cyclohexyl(meth)acrylate, 2-ethylhexyl(meth)acrylate, (iso)octyl(meth)acrylate, (iso)decyl(meth)acrylate, (iso)dodecyl(meth)acrylate and (iso)stearyl(meth)acrylate.

Meanwhile, the terms "(iso- or tertiary-)" and "(iso)" as used herein mean both the structure in which the groups expressed by "iso or tertiary" and "iso" respectively are present, and the structure in which these groups are not present (i.e., normal). and the "(meth)acrylate" means acrylate and/or methacrylate.

The aromatic group-containing monomer may contain a substituent group having a hetero atom, and is preferably a vinyl monomer containing an aromatic group having 6 to 22 carbon atoms. Among these aromatic group-containing monomers, preferred are a styrene-based monomer, an aromatic group-containing (meth)acrylate, and combination of the styrene-based monomer and aromatic group-containing (meth)acrylate.

Examples of the preferred styrene-based monomer include styrene, 2-methyl styrene and divinyl benzene. Among these styrene-based monomers, more preferred is styrene.

Examples of the preferred aromatic group-containing (meth)acrylate include benzyl(meth)acrylate and phenoxyethyl(meth)acrylate. Among these aromatic group-containing (meth)acrylates, more preferred is benzyl(meth)acrylate.

[(c) Macromer]

The macromer (c) is a compound which contains a polymerizable functional group at one terminal end thereof and has a number-average molecular weight of from 500 to 100,000, and can be used as a monomer component of the anionic polymer for enhancing a storage stability of the anionic polymer particles in the resulting ink. The polymerizable functional group bonded to one terminal end of the macromer is preferably an acryloyloxy group or a methacryloyloxy group. Among these polymerizable functional groups, preferred is a methacryloyloxy group.

The macromer (c) preferably has a number-average molecular weight of from 500 to 100,000 and more preferably from 1,000 to 10,000. Meanwhile, the number-average molecular weight of the macromer (c) may be measured by gel permeation chromatography using chloroform containing 1 mmol/L of dodecyl dimethylamine as a solvent and using polystyrene as a reference standard substance.

As the macromer (c), from the viewpoint of a good dispersion stability of the anionic polymer particles in the resulting ink, there are preferably used an aromatic group-containing monomer-based macromer and a silicone-based macromer. Among these macromers, preferred is the aromatic group-containing monomer-based macromer.

Examples of the aromatic group-containing monomer constituting the aromatic group-containing monomer-based macromer include the aromatic group-containing monomers as described above with respect to the hydrophobic monomer (b). Among these aromatic group-containing monomers, preferred are styrene and benzyl(meth)acrylate, and more preferred is styrene.

Specific examples of the styrene-based macromer include AS-6(S), AN-6(S) and HS-6(S) (tradenames of products available from Toagosei Co., Ltd.), etc.

Examples of the silicone-based macromer include organopolysiloxanes having a polymerizable functional group at one terminal end thereof.

[(d) Nonionic Monomer]

The monomer mixture may further contain (d) a nonionic monomer (hereinafter occasionally referred to merely as a "component (d)").

Examples of the component (d) include 2-hydroxyethyl(meth)acrylate, 3-hydroxypropyl(meth)acrylate, polyethylene glycol (n=2 to 30 wherein n represents an average molar number of addition of oxyalkylene groups: hereinafter defined in the same way) (meth)acrylate, polypropylene glycol (n=2 to 30) (meth)acrylate, poly(ethylene glycol (n=1 to 15)/propylene glycol (n=1 to 15) (meth)acrylate, methoxypolyethylene glycol (n=1 to 30) (meth)acrylate, polyethylene glycol (n=1 to 30) (meth)acrylate 2-ethylhexyl ether, butoxypolyethylene glycol (n=1 to 30) (meth)acrylate, methoxy(ethylene glycol/propylene glycol copolymer) (n=1 to 30 in which n of ethylene glycol is 1 to 29) (meth)acrylate, and phenoxy(ethylene glycol/propylene glycol copolymer) (n=1 to 30 in which n of ethylene glycol is 1 to 29) (meth)acrylate. Among these components (d), preferred are polypropylene glycol (n=2 to 30) (meth)acrylate and phenoxy(ethylene glycol/propylene glycol copolymer) (meth)acrylate, and more preferred is combination of both the compounds.

Specific examples of commercially available products of the component (d) include NK Ester-series products available from Shin Nakamura Chemical Co., Ltd., such as "NK Ester M-20G", "NK Ester M-40G", "NK Ester M-90G" and "NK Ester M-230G"; and BLEMMER-series products available from NOF Corporation, such as "BLEMMER PE-90", "BLEMMER PE-200", "BLEMMER PE-350", "BLEMMER PME-100", "BLEMMER PME-200", "BLEMMER PME-400", "BLEMMER PME-1000", "BLEMMER PP-500", "BLEMMER PP-800", "BLEMMER PP-1000", "BLEMMER AP-150", "BLEMMER AP-400", "BLEMMER AP-550", "BLEMMER AP-800", "BLEMMER 50PEP-300", "BLEMMER 50POEP-800B" and "BLEMMER 43PAPE-600B".

These components (a) to (d) may be respectively used alone or in the form of a mixture of any two or more thereof.

Upon production of the vinyl-based polymer, the contents of the above components (a) to (c) in the monomer mixture (contents of unneutralized components; hereinafter defined in the same way) or the contents of the constitutional units derived from the components (a) to (c) in the vinyl-based polymer are as follows.

The content of the component (a) is preferably from 3 to 40% by weight, more preferably from 4 to 30% by weight and especially preferably from 5 to 25% by weight in view of stably dispersing the colorant-containing anionic polymer particles in the resulting ink.

The content of the component (b) is preferably from 5 to 98% by weight and more preferably from 10 to 80% by weight in view of enhancing an optical density of the resulting ink.

The content of the component (c) is preferably from 1 to 25% by weight and more preferably from 5 to 20% by weight in view of a good dispersion stability of the colorant-containing anionic polymer particles in the resulting ink.

The weight ratio of the component (a) to a sum of the components (b) and (c) [component (a)/(component (b)+ component (c))] is preferably from 0.01 to 1, more preferably from 0.02 to 0.67 and still more preferably from 0.03 to 0.50 in view of a good dispersion stability of the colorant-containing anionic polymer particles in the resulting ink and a good optical density of the resulting ink.

[Production of Anionic Polymer]

The anionic polymer used in the present invention may be produced by copolymerizing the monomer mixture by a known polymerization method. As the polymerization method, preferred is a solution polymerization method.

The solvent used in the solution polymerization method is not particularly limited. Examples of the solvent include organic polar solvents such as aliphatic alcohols having 1 to 3 carbon atoms, ketones, ethers and esters. Specific examples of the organic polar solvents include methanol, ethanol, acetone and methyl ethyl ketone. Among these solvents, preferred is methyl ethyl ketone.

The polymerization may be carried out in the presence of a polymerization initiator or a chain transfer agent. Examples of the preferred polymerization initiator include 2,2'-azobis (2,4-dimethylvaleronitrile). Examples of the preferred chain transfer agent include 2-mercapto ethanol.

The suitable polymerization conditions of the monomer mixture will vary depending upon the kind of polymerization initiator to be used, etc. The polymerization temperature is preferably from 50 to 80° C., and the polymerization time is preferably from 1 to 20 h. Further, the polymerization is preferably conducted in a nitrogen atmosphere or an atmosphere of an inert gas such as argon.

After completion of the polymerization reaction, the polymer thus produced may be isolated from the reaction solution by a known method such as reprecipitation and removal of solvent by distillation. The thus obtained polymer may be purified by reprecipitation, membrane separation, chromatography, extraction, etc., for removing unreacted monomers, etc., therefrom.

The weight-average molecular weight of the anionic polymer used in the present invention is preferably from 5,000 to 500,000, more preferably from 10,000 to 400,000 and still more preferably from 20,000 to 200,000 in view of a good dispersion stability of the colorant-containing anionic polymer particles in the resultant ink and a good optical density of the ink. Meanwhile, the weight-average molecular weight of the anionic polymer may be measured by the method as described in Examples below.

[Production of Colorant-Containing Anionic Polymer Particles]

The colorant-containing anionic polymer particles can be efficiently produced in the form of a water dispersion thereof by a process including the following steps (1) and (2).

Step (1): dispersing a mixture of the anionic polymer, an organic solvent, a colorant and water to obtain a dispersion of the colorant-containing anionic polymer particles; and Step (2): removing the organic solvent from the dispersion obtained in the step (1) to obtain a water dispersion of the colorant-containing anionic polymer particles.

In addition, the above production process may further include the following optional step (3).

Step (3): mixing the water dispersion obtained in the above step (2) with a crosslinking agent to subject the water dispersion to crosslinking treatment.

[Step (1)]

In the step (1), there is preferably used the method in which the anionic polymer is first dissolved in the organic solvent, and then the colorant and water are added, if required, together with optional components such as a neutralizing agent and a surfactant, to the thus obtained organic solvent solution and mixed together to obtain a dispersion of an oil-in-water type. The order of addition of the respective components to the anionic polymer organic solvent solution is not particularly limited, and it is preferred that the neutralizing agent, water and the colorant be successively added to the organic solvent solution in this order.

The organic solvent in which the anionic polymer is to be dissolved is not particularly limited. Examples of the preferred organic solvents include aliphatic alcohols having 1 to 3 carbon atoms, ketones, ethers and esters. Among these organic solvents, preferred is methyl ethyl ketone. When the anionic polymer is synthesized by a solution polymerization method, the solvent used in the solution polymerization may also be used as such in the step (1).

When using the neutralizing agent, the dispersion is preferably neutralized therewith such that the pH value of the dispersion lies within the range of from 7 to 11. Examples of the neutralizing agent include bases such as lithium hydroxide, sodium hydroxide, potassium hydroxide and various amines. In addition, the anionic polymer may be previously neutralized.

The degree of neutralization of the anionic group in the anionic polymer with the neutralizing agent is preferably from 10 to 300%, more preferably from 20 to 200% and still more preferably from 30 to 150% from the viewpoint of a good dispersion stability of the resulting water dispersion.

Meanwhile, the degree of neutralization as used herein means the value obtained by dividing a molar equivalent of the neutralizing agent by a molar amount of the anionic group in the anionic polymer.

The content of the colorant in the mixture is preferably from 5 to 50% by weight and more preferably from 10 to 40% by weight. The content of the organic solvent in the mixture is preferably from 10 to 70% by weight and more preferably from 10 to 50% by weight. The content of the anionic polymer in the mixture is preferably from 2 to 40% by weight and more preferably from 3 to 20% by weight, and the content of water in the mixture is preferably from 10 to 70% by weight and more preferably from 20 to 70% by weight.

The weight ratio of the colorant to the anionic polymer [colorant/anionic polymer] is preferably from 50/50 to 90/10 and more preferably from 70/30 to 85/15 from the viewpoint of a good dispersion stability of the resulting water dispersion.

The method for dispersing the mixture in the step (1) is not particularly limited. The colorant-containing anionic polymer particles may be finely atomized until obtaining fine particles having a desired average particle size, only by a substantial dispersion procedure. Preferably, the mixture is first subjected to a preliminary dispersion procedure, and then to the substantial dispersion procedure by applying a shear stress thereto so as to control the average particle size of the obtained colorant-containing anionic polymer particles to a desired value. The dispersion procedure in the step (1) is preferably conducted at a temperature of from 0 to 40° C. and more preferably from 5 to 30° C. The dispersing time is preferably from 1 to 30 h and more preferably from 2 to 25 h.

When subjecting the mixture to the preliminary dispersion procedure, there may be used ordinary mixing or stirring devices such as anchor blades and disper blades. In particular, high-speed stirring mixers are preferably used.

As a means for applying a shear stress to the mixture in the substantial dispersion procedure, there may be used, for example, kneading machines such as roll mills and kneaders, high-pressure homogenizers such as "Micro Fluidizer" (tradename: available from Microfluidics Inc.), and media-type dispersers such as a paint shaker and a beads mill. Examples of the commercially available media-type dispersers include "Ultra Apex Mill" (tradename) available from Kotobuki Industries Co., Ltd., and "Pico Mill" (tradename) available from Asada Iron Works Co., Ltd., etc. These dispersers may also be used in combination of any two or more thereof. Among these dispersers, from the viewpoint of reducing the particle size of the colorant-containing anionic polymer particles, the media-type disperser is preferably used in combination with the high-pressure homogenizer.

[Step (2)]

In the step (2), the organic solvent is removed from the thus obtained dispersion by known methods, thereby obtaining a water dispersion of the colorant-containing anionic polymer particles. The organic solvent is preferably substantially completely removed from the thus obtained water dispersion of the colorant-containing anionic polymer particles. However, the residual organic solvent may be present in the water dispersion unless the objects and effects of the present invention are adversely affected by the residual organic solvent. When subjected to a crosslinking reaction, the residual organic solvent may also be removed again from the water dispersion obtained after the crosslinking reaction, if required. The content of the residual organic solvent in the resulting water dispersion is preferably 0.1% by weight or less and more preferably 0.01% by weight or less.

Further, if required, the dispersion before removing the organic solvent therefrom may be subjected to heating and stirring treatments.

In the thus-obtained water dispersion of the colorant-containing anionic polymer particles, solid components constituted of the colorant-containing polymer are dispersed in water as a main solvent. The configuration of the polymer particles is not particularly limited as long as the particles are formed from at least the colorant and the anionic polymer. Examples of the configuration of the polymer particles include the particle configuration in which the colorant is enclosed in the polymer, the particle configuration in which the colorant is uniformly dispersed in the polymer, and the particle configuration in which the colorant is exposed onto a surface of the respective polymer particles, as well as a mixture of the particles having the above particle configurations.

[Step (3)]

In the step (3) as an optional step, the water dispersion obtained in the step (2) is mixed with a crosslinking agent to subject the water dispersion to crosslinking treatment, thereby obtaining a water dispersion of the crosslinked polymer particles. The step (3) is preferably carried out for attaining a good storage stability of the resulting water dispersion and ink.

The crosslinking agent used above is preferably in the form of a compound containing a functional group(s) capable of reacting with the anionic group in the anionic polymer, more preferably a compound containing the two or more functional groups in a molecule thereof, and still more preferably a compound containing the 2 to 6 functional groups in a molecule thereof.

Examples of the suitable crosslinking agent include compounds containing two or more epoxy groups in a molecule thereof, compounds containing two or more oxazoline groups in a molecule thereof, and compounds containing two or more isocyanate groups in a molecule thereof. Among these compounds, preferred are the compounds containing two or more epoxy groups in a molecule thereof, and more preferred is trimethylol propane polyglycidyl ether.

The amount of the crosslinking agent used in the crosslinking reaction is adjusted such that the weight ratio of the crosslinking agent to the anionic polymer [crosslinking agent/anionic polymer] is preferably from 0.3/100 to 50/100, more preferably from 1/100 to 40/100, and still more preferably from 5/100 to 25/100 from the viewpoint of a good storage stability of the resulting water dispersion and ink.

In addition, the crosslinking gent is used in an amount capable of reacting with preferably from 0.1 to 20 mmol, more preferably from 0.5 to 15 mmol and still more preferably from 1 to 10 mmol of the anionic group in the anionic polymer as measured in terms of the anionic group per 1 g of the anionic polymer.

The crosslinked polymer obtained after the above crosslinking treatment preferably contains the anionic group neutralized with the base in an amount of 0.5 mmol or larger per 1 g of the crosslinked polymer.

The crosslinking rate of the crosslinked polymer is preferably from 10 to 80 mol %, more preferably from 20 to 70 mol % and still more preferably from 30 to 60 mol %. The crosslinking rate is the value obtained by dividing the number of moles of a reactive group of the crosslinking agent by the number of moles of a reactive group of the polymer capable of reacting with the crosslinking agent.

[Water-Based Ink (B) Containing Anionic Colorant]

The water-based ink (B) containing an anionic colorant as used in the present invention may also contain various additives ordinarily used in inks such as wetting agents, penetrants, dispersants, surfactants, viscosity modifiers, defoaming agents, anti-septic agents, mildew-proof agents and rust preventives.

The contents of the respective components in the water-based ink (B) used in the present invention are as follows.

The content of the anionic colorant particles in the water-based ink (B) used in the present invention is preferably from 1 to 40% by weight, more preferably from 2 to 30% by weight, still more preferably from 4 to 20% by weight and further still more preferably from 5 to 15% by weight from the viewpoint of enhancing an optical density of the resulting water-based ink.

The content of the colorant in the anionic colorant particles which are contained in the water-based ink (B) used in the present invention is preferably from 1 to 25% by weight, more preferably from 2 to 20% by weight, still more preferably from 4 to 15% by weight and further still more preferably from 5 to 12% by weight on the basis of the weight of the water-based ink (B) from the viewpoint of enhancing an optical density of the resulting water-based ink.

The content of water in the water-based ink (B) is preferably from 20 to 90% by weight, more preferably from 30 to 80% by weight and still more preferably from 40 to 70% by weight.

The surface tension of the water-based ink (B) used in the present invention (as measured at 20° C.) is preferably from 23 to 50 mN/m, more preferably from 23 to 45 mN/m and still more preferably from 25 to 40 mN/m.

The viscosity of the water-based ink (B) used in the present invention (as measured at 20° C.) is preferably from 2 to 20 mPa·s, more preferably from 2.5 to 16 mPa·s and still more preferably from 2.5 to 12 mPa·s in order to keep a good ejection property of the ink.

The type of ink-jet printers to which the water-based ink (B) used in the present invention is applicable is not particularly limited, and the water-based ink (B) may be suitably employed in ink-jet printers of a piezoelectric type.

[Ink-Jet Printing Method]

In the ink-jet printing method according to the present invention, the above ink (A) is applied onto a recording medium, and then the water-based ink (B) is applied by ink-jet printing, onto the recording medium. As a result, even when using a plain paper as the recording medium, it is possible to enhance an optical density of the ink and form ink dots having a round shape upon printing and obtain printed images which have an excellent image clarity and are free from occurrence of severe strike-through. In the above method, the time period between the application of the ink (A) and the application of the ink (B) is not particularly limited.

In addition, the method of applying (coating) the ink (A) onto the recording medium is not particularly limited. Specific examples of the method of applying the ink (A) onto the recording medium include a spray coating method, a brush coating method, a roller coating method, and an ink-jetting method. Among these methods, preferred are a roller coating method and an ink-jetting method, and more preferred is a roller coating method. When using the ink-jetting method, an ink-jet printer of a piezoelectric type may be suitably used for the above purpose.

In these ink-applying methods, there may be used such a printer equipped with a device for applying the ink (B) in which a device for applying the ink (A) is also mounted.

Further, there may also be used coating methods generally used for producing coated papers such as methods using a size press, a roll coater, a blade coater, an air knife coater, etc. Among these coating methods, preferred is a cast coating method. In the cast coating method, it is preferred that the ink be applied onto a paper as a recording medium by using a cast coater to transfer a mirror surface of a cast drum onto the recording medium. Further, it is also preferred that after forming a cast film on a glass plate, etc., as a mirror surface, the paper is overlapped thereon to transfer the mirror surface thereto by using a roll.

The ink-jet printing for applying the water-based ink (B) onto the recording medium is not particularly limited, and is preferably performed by the method using an ink-jet printer of a piezoelectric type.

[Recording Medium]

The recording medium used in the ink-jet printing method according to the present invention is not particularly limited. Examples of the recording medium include a plain paper, a coated paper and a transparent film. The ink-jet printing method according to the present invention can be suitably applied to so-called plain papers such as a copying paper and a bond paper from the viewpoint of enhancing an optical density and an image clarity and preventing occurrence of strike-through.

[Recording Paper for Ink-Jet Printing]

The paper used in the ink-jet printing method according to the present invention is not particularly limited, and is preferably a recording paper for ink-jet printing which is obtained by applying the ink (A) having a static surface tension of from 23 to 70 mN/m and containing the poly(N-acylalkylene imine)-modified silicone and the cationic polymer to a base paper as the recording medium.

As the base paper as the recording medium, there may be used the above-mentioned papers such as a plain paper and a coated paper. Among these papers, preferred are plain papers such as a copying paper and a bond paper.

Also, as the method of applying the ink (A) to the recording medium, there may be used the above-mentioned coating methods generally used for producing coated papers. Among these coating methods, preferred is a cast coating method.

After applying the ink (A) to the recording medium, the resulting paper is dried to obtain a recording paper for ink-jet printing. The drying temperature is preferably from 50 to 150° C. and more preferably from 80 to 120° C.

[Water-Based Ink Set]

The water-based ink set according to the present invention contains the ink (A) having a static surface tension of from 23 to 70 mN/m and containing the poly(N-acylalkylene imine)-modified silicone and the cationic polymer, and the water-based ink (B) containing the anionic colorant. The water-based ink set according to the present invention may also contain, in addition to the ink (A) and the water-based ink (B), other inks. The respective inks in the water-based ink set may be used in combination of plural kinds thereof, or the water-based ink set may be constituted from the ink (A) and the water-based ink (B) solely.

EXAMPLES

In the following Production Examples, Preparation Examples, Examples and Comparative Examples, the terms "part(s)" and "%" represent "part(s) by weight" and "% by weight", respectively, unless otherwise specified. Meanwhile, a weight-average molecular weight (Mw) of the polymer and a static surface tension of the ink (A) were respectively measured by the following methods, and the water-based ink set was evaluated for an optical density, a roundness of ink dots, an image clarity and strike-through by forming printed images therewith by the following printing method.

(1) Measurement of Weight-Average Molecular Weight (Mw)

(1-1) Molecular Weight of Anionic Polymer

The weight-average molecular weight of the anionic polymer was measured by gel permeation chromatography [GPC apparatus: "HLC-8120GPC" available from Tosoh Corp.; column: "TSK-GEL, α-M"×2 available from Tosoh Corp.; flow speed: 1 mL/min)] using a dimethyl sulfoxide solution containing 60 mmol/L of $H_3PO_4$ and 50 mmol/L of LiBr as an eluent and using a polystyrene as a reference standard substance.

(1-2) Molecular Weight of Cationic Polymer

The weight-average molecular weight of the cationic polymer was measured by gel permeation chromatography [GPC apparatus: "HLC-8120GPC" available from Tosoh Corp.; column: "TSK-GEL, α-M"×2 available from Tosoh Corp.; flow speed: 1 mL/min)] using a 1% acetic acid aqueous solution containing 0.15 mol/L of $Na_2SO_4$ as an eluent and using polyethylene glycol as a reference standard substance.

(1-3) Molecular Weight of Poly(N-Acylalkylene Imine)-Modified Silicone

The weight-average molecular weight of the poly(N-acylalkylene imine)-modified silicone was measured by gel permeation chromatography [GPC apparatus: "HLC-8120GPC" available from Tosoh Corp.; column: "TSK-GEL, K-804L"×2 available from Tosoh Corp.; flow speed: 1 mL/min)] using a chloroform solution containing 1 mmol/L of "FARMIN DM20" available from Kao Corp., as an eluent and using a polystyrene as a reference standard substance.

(2) Measurement of Static Surface Tension

Using a surface tension meter "CBVP-Z" (tradename) available from Kyowa Interface Science Co., Ltd., a platinum plate was immersed in 5 g of the ink (A) filled in a cylindrical polyethylene container (diameter: 3.6 cm×depth: 1.2 cm) to measure a static surface tension of the ink (A) at 20° C.

(3) Evaluation of Optical Density

Printed images obtained the respective Example and Comparative Examples were allowed to stand at a temperature of 25° C. and a humidity of 50% for 24 h, and then an optical density on a surface of the printed images was measured. The measurement of the optical density was carried out by reading out a numeral value of a magenta density component in 100% duty printed images using a Macbeth densitometer "RD914" (product number) available from Gretag Macbeth Corp., under the following measuring conditions: observation light source: D65; observation field of view: 2'; density standard: DIN 16536. The frequency of the measurement was as follows. That is, while varying the measuring positions, the measurement of optical density was conducted at 5 points on the printed images formed along an advancing stroke of bidirectional printing, and 5 points on the printed images formed along a returning stroke of bidirectional printing to thereby obtain 10 density values in total and calculate an average value of the thus measured values. The larger measured value indicates a higher optical density and a better result.

(4) Evaluation of Roundness of Ink Dots

Among the printed images obtained in the respective Examples and Comparative Examples, a surface of the 10% duty printed images was magnified by 500 times using a microscope "Model VH-Z500/VHX-500" available from Keyenece Co, Ltd., and the magnified images were visually observed to evaluate spread of one ink dot over the printed paper according to the following ratings.

[Evaluation Ratings]

A: No penetration of ink in the fiber direction was observed, and ink dots had a round shape;

B: Slight penetration of ink in the fiber direction was observed, but ink dots still had a round shape;

C: Penetration of ink in the fiber direction was observed, and ink dots had no round shape; and D: Severe penetration of ink in the fiber direction was observed, and ink dots had no clear boundary.

(5) Evaluation of Image Clarity

Among the printed images obtained in the respective Examples and Comparative Examples, the printed character "蟲" (Kanji character JIS Code: 396C (JIS X 0208)) was visually observed in an magnified scale using a loupe (magnifying lens). The image clarity was evaluated according to the following four ratings.

[Evaluation Ratings]

A: No feathering (wicking along paper fibers or bleeding) was observed;

B: Slight feathering was observed;

C: Much feathering was observed, but the printed character was still recognized; and D: Considerable feathering was observed, and the printed character was no longer recognized.

(6) Evaluation of Strike-Through

Among the printed images obtained in the respective Examples and Comparative Examples, an optical density of a reverse side surface of the 100% duty printed images was measured in the same manner as defined in the above "(3) Evaluation of Optical Density". The smaller measured value indicates that occurrence of strike-through was more effectively prevented.

Production Example 1

Synthesis of Poly(N-Acylalkylene Imine)-Modified Silicone (1)

A solution prepared by dissolving 10.95 parts of diethyl sulfate and 289.05 parts of 2-ethyl-2-oxazoline in 578.1 parts of ethyl acetate was heated under reflux in a nitrogen atmosphere for 4 h to obtain a terminal-reactive poly(N-propionylethylene imine). Then, a solution prepared by dissolving 200 parts of polydimethyl siloxane having primary aminopropyl-modified side chains (weight-average molecular weight: 30,000; amine equivalent: 2000 g/mol) in 400 parts of ethyl acetate was added at one time to the resulting reaction solution, and the obtained mixture was heated under reflux for 8 h. The resulting reaction mixture was concentrated under reduced pressure to thereby obtain a poly(N-propionylethylene imine)dimethyl siloxane copolymer (hereinafter referred to as "poly(N-acylalkylene imine)-modified silicone"; weight ratio of segment (x) to segment (y) (segment (x)/segment (y)): 40/60) in the form of a light-yellow rubber-like solid. The weight-average molecular weight of the poly(N-acylalkylene imine)-modified silicone was 80,000.

Ten grams of the thus obtained light-yellow rubber-like solid were dissolved in 100 g of ethanol, and 50 g of ion-exchanged water were further added to the resulting solution, and a whole amount of ethanol and a part of water were removed by distillation from the obtained solution using a rotary evaporator and substituted with the ion-exchanged water. Further, the concentration of the reaction solution was controlled by adding ion-exchanged water thereto, thereby obtaining 50 g of a water dispersion of a poly(N-acylalkylene imine)-modified silicone (1) (effective ingredient: 20%).

Preparation Example 1

Preparation of Comparative Ink (a-1)

Ion-exchanged water was added to and mixed with 15 parts of the water dispersion of the poly(N-acylalkylene imine)-modified silicone (1) (effective amount of modified silicone: 3 parts) obtained in Production Example 1 and 5 parts of polyethylene glycol (average molecular weight: 600) available from Wako Pure Chemical Industries, Ltd., such that a total amount of the obtained mixture was 100 parts. The resulting mixture was stirred using a magnetic stirrer and then passed through a 1.2 μm-mesh filter (cellulose acetate membrane; available from Sartorius AG), thereby obtaining a comparative ink (a-1).

Production Example 2

Preparation of Water Dispersion of Colorant-Containing Anionic Polymer Particles (1) Synthesis of Anionic Polymer Fifty eight parts of benzyl methacrylate, 42 parts of methacrylic acid, 20 parts of styrene, 40 parts of a styrene macromer "AS-6S" (tradename) (solid content: 50%) available from Toagosei Co., Ltd., 30 parts of polyethylene glycol methacrylate "BLEMMER PP-800" (tradename) available from NOF Corp., and 30 parts of phenoxy poly(ethylene glycol/propylene glycol) methacrylate "BLEMMER 43PAPE-600B" (tradename) available from NOF Corp., were mixed with each other to obtain a monomer mixture solution.

A reaction vessel was charged with 18 parts of methyl ethyl ketone and 0.03 part of a chain transfer agent (2-mercaptoethanol) as well as 10% of the above prepared monomer mixture solution. The contents of the reaction vessel were mixed with each other, and then the reaction vessel was fully purged with a nitrogen gas.

Separately, remaining 90% of the monomer mixture solution were charged together with 0.27 part of the above chain transfer agent, 42 parts of methyl ethyl ketone and 1.2 parts of a polymerization initiator "V-65" (tradename; 2,2'-azobis(2,4-dimethylvaleronitrile) available from Wako Pure Chemical Industries, Ltd., into a dropping funnel and mixed with each other to thereby obtain a mixed solution. The mixed solution in the reaction vessel was heated to 75° C. while stirring in a nitrogen atmosphere, and then the mixed solution in the dropping funnel was dropped thereinto over 3 h. After the elapse of 2 h from completion of the dropping at 75° C., a solution prepared by dissolving 0.3 part of the polymerization initiator in 5 parts of methyl ethyl ketone was added to the above obtained solution, and the resulting reaction solution was further aged at 75° C. for 2 h and then at 80° C. for 2 h to obtain a solution of an anionic polymer (weight-average molecular weight: 100,000).

(2) Preparation of Water Dispersion (1) of Colorant-Containing Anionic Polymer Particles Forty five parts of the polymer produced by drying the solution of the anionic polymer obtained in the above (1) under reduced pressure were dissolved in 300 parts of methyl ethyl ketone. Then, 10.2 parts of a 5N sodium hydroxide aqueous solution and 12.2 parts of a 25% ammonia aqueous solution both serving as a neutralizing agent were added together with 1150 parts of ion-exchanged water to the resulting solution, and further 135 parts of a magenta pigment "CHROMOFINE RED" (tradename: quinacridone pigment) available from Dainichiseika Color & Chemicals Mfg. Co., Ltd., were added into the above obtained mixture, and then the resulting mixture was stirred at 20° C. for 1 h using a disper blade operated at 7000 rpm. Thereafter, the thus obtained mixture was further mixed and dispersed at 20° C. for 40 min using a beads mill-type disperser "UltraApex Mill, Model UAM-05" (media particles: zirconia beads; particle size: 0.05 mm) available from Kotobuki Industries Co., Ltd. The thus prepared dispersion was further dispersed under a pressure of 180 MPa by passing through a disperser "MICROFLUIDIZER, Model M-140K" (tradename: high-pressure homogenizer) available from Microfluidics Corp., 5 times.

The resulting dispersion was placed at 60° C. under reduced pressure to remove methyl ethyl ketone and further a part of water therefrom. The obtained mixture was subjected to centrifugal separation and then passed through a filter "Minisart Syringe Filter" (pore size: 5 μm; material: cellulose acetate) available from Sartorius AG to remove coarse particles therefrom, thereby obtaining a water dispersion (1) of colorant-containing anionic polymer particles [solid content: 30.0%; average particle size: 75 nm].

Preparation Example 2

Preparation of Water-Based Ink (B)

The water dispersion (1) of the colorant-containing anionic polymer particles obtained in Production Example 2 was prepared in such an amount that a solid content therein was 13.3 parts and a pigment content therein was 10.0 parts.

Two parts of 1,2-hexanediol available from Tokyo Kasei Chemical Industry Co., Ltd., 2.0 parts of 2-pyrrolidone available from Wako Pure Chemical Industries, Ltd., 0.5 part of "SURFYNOL 465" available from Nissin Chemical Industry Co., Ltd., 0.5 part of "OLFINE E1010" available from Nissin Chemical Industry Co., Ltd., 2.0 parts of glycerol available from Kao Corp., 10.0 parts of triethylene glycol monobutyl ether "Butyl Triglycol" (tradename) available from Nippon Nyukazai Co., Ltd., and 0.3 part of "Ploxel XL2" available from Avecia K.K., were mixed with ion-exchanged water while stirring using a magnetic stirrer, followed by further stirring the resulting mixture for 15 min at room temperature, thereby obtaining a mixed solution. Meanwhile, the amount of ion-exchanged water compounded above was controlled such that a total amount of the mixed solution and the above water dispersion (1) was 100 parts.

Next, the above mixed solution was added to the water dispersion (1) of the colorant-containing anionic polymer particles while stirring the latter dispersion using a magnetic stirrer, and then the resulting dispersion was passed through a 1.2 μm-mesh filter (cellulose acetate membrane; available from Sartorius AG), thereby obtaining a water-based ink (B).

Comparative Example 1

Ink-Jet Printing (1) Application of Comparative Ink (a-1) by Roller Coating

The comparative ink (a-1) obtained in Preparation Example 1 was impregnated in a hand roller made of a sponge material (material: polyurethane; width: 15 cm; diameter: 5 cm), and applied onto one surface of a plain paper "NPI55" (product number; paper size: A4) available from Nippon Paper Corp., such that a coating amount of the ink was 25 g/m$^2$, and the thus treated paper was allowed to stand at a temperature of 20° C. and a relative humidity of 35% for 6 h.

(2) Printing with Water-Based Ink (B)

Next, the water-based ink (B) prepared in Preparation Example 2 was filled into an ink inlet port disposed above a black ink head of an ink-jet printer "Model EM-930C" (piezoelectric type) available from Seiko Epson Corp., through a silicone tube. Then, a solid image printing pattern (size: 204 mm in width×275 mm in length) was prepared using "Photoshop" (tradename) available from Adobe Systems Inc., and a 100% duty solid image and a 10% duty solid image were printed on a plain paper. In addition, the character "轟" (font: MS mincho; font size: 12 point) was printed on a plain paper to which the comparative ink (a-1) was previously applied (printing conditions: kind of paper: photo-printing paper; mode set: Black, Photo, Bidirectional). The evaluation results are shown in Table 1.

Preparation Example 3

Preparation of Comparative Ink (a-2)

The same procedure as in Preparation Example 1 was repeated except that the poly(N-acylalkylene imine)-modified silicone (1) was replaced with a polyethylene glycol-modified silicone "KF353" (tradename, HLB:10) available from Shin-Etsu Silicone K.K., thereby obtaining a comparative ink (a-2). Meanwhile, the polyethylene glycol-modified silicone was added in such an amount that an amount of the effective ingredient thereof was the same as the amount of the poly(N-acylalkylene imine)-modified silicone (3 parts).

Comparative Example 2

The same ink-jet printing procedure as in Comparative Example 1 was repeated except that the comparative ink (a-1) was replaced with the comparative ink (a-2). The evaluation results are shown in Table 1.

Preparation Example 4

Preparation of Comparative Ink (a-3)

The same procedure as in Preparation Example 1 was repeated except that the poly(N-acylalkylene imine)-modified silicone (1) was replaced with ion-exchanged water, thereby obtaining a comparative ink (a-3).

Comparative Example 3

The same ink-jet printing procedure as in Comparative Example 1 was repeated except that the comparative ink (a-1) was replaced with the comparative ink (a-3) (using no modified silicone). The evaluation results are shown in Table 1.

Production Example 3

Synthesis of Poly(N-Acylalkylene Imine)-Modified Silicone (2)

A solution prepared by dissolving 6.17 parts of diethyl sulfate and 185.99 parts of 2-ethyl-2-oxazoline in 371.98 parts of ethyl acetate was heated under reflux in a nitrogen atmosphere for 4 h to obtain a terminal-reactive poly(N-propionylethylene imine). Then, a solution prepared by dissolving 200 parts of polydimethyl siloxane having primary aminopropyl-modified side chains (weight-average molecular weight: 30,000; amine equivalent: 3800 g/mol) in 400 parts of ethyl acetate was added at one time to the resulting reaction solution, and the obtained mixture was heated under reflux for 8 h. The resulting reaction mixture was concentrated under reduced pressure to thereby obtain a poly(N-propionylethylene imine)dimethyl siloxane copolymer (weight ratio of segment (x) to segment (y) (segment (x)/segment (y)): 51/49) in the form of a light-yellow rubber-like solid. The weight-average molecular weight of the poly(N-propionylethylene imine)dimethyl siloxane copolymer was 80,000.

Subsequently, 10 g of the thus obtained light-yellow rubber-like solid were treated in the same manner as in Production Example 1, thereby obtaining 50 g of a water dispersion of a poly(N-acylalkylene imine)-modified silicone (2) (effective ingredient: 20%).

Production Example 4

Synthesis of Poly(N-Acylalkylene Imine)-Modified Silicone (3)

A solution prepared by dissolving 1.54 parts of diethyl sulfate and 25.73 parts of 2-ethyl-2-oxazoline in 51.46 parts of ethyl acetate was heated under reflux in a nitrogen atmosphere for 4 h to obtain a terminal-reactive poly(N-propionylethylene imine). Then, a solution prepared by dissolving 200 parts of polydimethyl siloxane having primary aminopropyl-modified side chains (weight-average molecular weight: 100,000; amine equivalent: 20000 g/mol) in 400 parts of ethyl acetate was added at one time to the resulting reaction solution, and the obtained mixture was heated under reflux for 8 h. The resulting reaction mixture was concentrated under reduced pressure to thereby obtain a poly(N-propionylethylene imine)dimethyl siloxane copolymer (weight ratio of segment (x) to segment (y) (segment (x)/segment (y)): 88/12) in the form of a light-yellow rubber-like solid. The weight-average molecular weight of the poly(N-propionylethylene imine)dimethyl siloxane copolymer was 110,000.

Subsequently, 10 g of the thus obtained light-yellow rubber-like solid were treated in the same manner as in Production Example 1, thereby obtaining 50 g of a water dispersion of a poly(N-acylalkylene imine)-modified silicone (3) (effective ingredient: 20%).

Production Example 5

Synthesis of Cationic Polymer (1)

Eighty parts of methacryloyloxyethyl trimethyl ammonium chloride "QDM" (tradename) available from MRC Unitec Co., Ltd., 120 parts of ion-exchanged water, and 0.8 part of a chain transfer agent "THIOGLYCEROL" available from Tokyo Kasei Chemical Industry Co., Ltd., thereby preparing a monomer aqueous solution.

Ten parts of the above-prepared monomer aqueous solution were charged into a 500 mL separable flask previously purged with nitrogen. On the other hand, a mixed solution prepared by adding 1.6 parts of 2,2'-azobis(2,4-dimethylvaleronitrile) "V-65" (tradename) available from Wako Pure

TABLE 1

| | | | Comparative Example 1 | Comparative Example 2 | Comparative Example 3 |
|---|---|---|---|---|---|
| Ink (A) | Ink No. | | Comparative ink (a-1) | Comparative ink (a-2) | Comparative ink (a-3) |
| | Modified silicone | Kind | Silicone (1) | KF353 | None |
| | | Production Example | Production Example 1 | — | — |
| | | [(x)/(y)] | 40/60 | — | — |
| | | Mw | 80000 | — | — |
| | | Amount compounded (wt %) | 3 | 3 | — |
| | Properties | Surface tension (mN/m) | 45 | 25 | 45 |
| | Method of applying ink (A) | | Roller coating | Roller coating | Roller coating |
| Ink (B) | Anionic colorant | | Polymer particles | Polymer particles | Polymer particles |
| Evaluation | Optical density | | 1.25 | 0.95 | 0.85 |
| | Roundness of ink dots | | A | C | D |
| | Image clarity | | A | C | D |
| | Strike-through | | 0.23 | 0.35 | 0.35 |

Chemical Industries, Ltd., to the remainder of the monomer aqueous solution was charged into a dropping funnel. The mixed solution in the reaction vessel was heated to 75° C. while stirring in a nitrogen atmosphere, and the mixed solution in the dropping funnel was added dropwise thereto for 3 h. After the elapse of 2 h from completion of the dropping at 75° C., a solution prepared by dissolving 1.6 parts of the above polymerization initiator in 5 parts of ion-exchanged water was added to the resulting reaction solution, and the obtained reaction mixture was aged at 75° C. for 2 h and then at 80° C. for 2 h, and further diluted with an adequate amount of ion-exchanged water, thereby obtaining a 15% aqueous solution of a cationic polymer (1) (weight-average molecular weight: 5000).

Preparation Example 5

Preparation of Ink (A-1)

Ion-exchanged water was added to and mixed with 26.7 parts of the aqueous solution of the cationic polymer (1) (effective ingredient: 4 parts) obtained in Production Example 5, 15 parts of the water dispersion of the poly(N-acylalkylene imine)-modified silicone (1) (effective amount of modified silicone: 3 parts) obtained in Production Example 1, and 5 parts of polyethylene glycol (molecular weight: 600) such that a total amount of the obtained mixture was 100 parts. The resulting mixture was stirred using a magnetic stirrer and then passed through a 1.2 μm-mesh filter (cellulose acetate membrane; available from Sartorius AG), thereby obtaining an ink (A-1).

Preparation Example 6

Preparation of Ink (A-2)

The same procedure as in Preparation Example 5 was repeated except that the poly(N-acylalkylene imine)-modified silicone (1) was replaced with the poly(N-acylalkylene imine)-modified silicone (2) obtained in Production Example 3, thereby obtaining an ink (A-2).

Preparation Example 7

Preparation of Ink (A-3)

The same procedure as in Preparation Example 5 was repeated except that the poly(N-acylalkylene imine)-modified silicone (1) was replaced with the poly(N-acylalkylene imine)-modified silicone (3), thereby obtaining an ink (A-3).

Preparation Example 8

Preparation of Comparative Ink (a-4)

The same procedure as in Preparation Example 7 was repeated except that 1 part of ion-exchanged water among a whole amount of ion-exchanged water used therein was replaced with 1 part of "ACETYLENOL E100", thereby obtaining a comparative ink (a-4).

Preparation Example 9

Preparation of Comparative Ink (a-5)

The same procedure as in Preparation Example 5 was repeated except that the poly(N-acylalkylene imine)-modified silicone (1) was replaced with a polyethylene glycol-modified silicone "KF353" (tradename, HLB10) available from Shin-Etsu Silicone K.K., thereby obtaining a comparative ink (a-5). Meanwhile, the polyethylene glycol-modified silicone was added in such an amount that an amount of the effective ingredient thereof was the same as the amount of the poly(N-acylalkylene imine)-modified silicone (3 parts).

Preparation Example 10

Preparation of Comparative Ink (a-6)

The same procedure as in Preparation Example 5 was repeated except that the poly(N-acylalkylene imine)-modified silicone (1) was replaced with ion-exchanged water, thereby obtaining a comparative ink (a-6).

Examples 1 to 3 and Comparative Examples 4 to 6

The same ink-jet printing procedure as in Comparative Example 1 was repeated except that the comparative ink (a-1) was replaced with the inks (A-1) to (A-3) and the comparative inks (a-4) to (a-6), respectively. The evaluation results are shown in Table 2.

TABLE 2

| | | | Examples | | | Comparative Examples | | |
|---|---|---|---|---|---|---|---|---|
| | | | 1 | 2 | 3 | 4 | 5 | 6 |
| Ink (A) | Ink No. | | Ink (A-1) | Ink (A-2) | Ink (A-3) | Comparative ink (a-4) | Comparative ink (a-5) | Comparative ink (a-6) |
| | Modified silicone | Kind | Silicone (1) | Silicone (2) | Silicone (3) | Silicone (3) | KF353 | None |
| | | Production Example | Production Example 1 | Production Example 3 | Production Example 4 | Production Example 4 | — | — |
| | | [(x)/(y)] | 40/60 | 51/49 | 88/12 | 88/12 | — | — |
| | | Mw | 80000 | 80000 | 110000 | 110000 | — | — |
| | | Amount compounded (wt %) | 3 | 3 | 3 | 3 | 3 | — |
| | Cationic polymer | Kind | Polymer (1) | Polymer (1) | Polymer (1) | Polymer (1) | Polymer (1) | Polymer (1) |
| | | Production Example | Production Example 5 | Production Example 5 | Production Example 5 | Production Example 5 | Production Example 5 | Production Example 5 |

TABLE 2-continued

|  |  |  | Examples | | | Comparative Examples | | |
| --- | --- | --- | --- | --- | --- | --- | --- | --- |
|  |  |  | 1 | 2 | 3 | 4 | 5 | 6 |
|  |  | Molecular weight | 5000 | 5000 | 5000 | 5000 | 5000 | 5000 |
|  |  | Amount compounded (wt %) | 4 | 4 | 4 | 4 | 4 | 4 |
|  | Properties | Surface tension (mN/m) | 45 | 45 | 45 | 22 | 28 | 45 |
|  |  | Method of applying ink (A) | Roller coating | Roller coating | Roller coating | Roller coating | Roller coating | Roller coating |
| Ink (B) |  | Anionic colorant | Polymer particles | Polymer particles | Polymer particles | Polymer particles | Polymer particles | Polymer particles |
| Evaluation |  | Optical density | 1.35 | 1.38 | 1.25 | 1.27 | 1.11 | 1.25 |
|  |  | Roundness of ink dots | A | A | A | B | C | C |
|  |  | Image clarity | A | A | A | B | C | B |
|  |  | Strike-through | 0.17 | 0.15 | 0.15 | 0.29 | 0.31 | 0.25 |

Production Example 6

Synthesis of Cationic Polymer (2))

Glycolic acid (70% aqueous solution of effective ingredient) available from Kishida Chemical Co., Ltd., was gradually added to polyethylene imine (molecular weight: 1800) available from Wako Pure Chemical Industries, Ltd., to adjust a pH value of the resulting mixture to 7.0. Then, the concentration of the mixture was controlled by adding ion-exchanged water thereto, thereby obtaining a 50% aqueous solution of a cationic polymer (2).

Preparation Example 11

Preparation of Ink (A-4)

Ion-exchanged water was added to and mixed with 8 parts of the aqueous solution of the cationic polymer (2) (effective ingredient: 4 parts) obtained in Production Example 6, 15 parts of the water dispersion of the poly(N-acylalkylene imine)-modified silicone (1) (effective amount of modified silicone: 3 parts) obtained in Production Example 1, and 5 parts of polyethylene glycol (molecular weight: 600) such that a total amount of the obtained mixture was 100 parts. The resulting mixture was stirred using a magnetic stirrer and then passed through the above 1.2 μm-mesh filter, thereby obtaining an ink (A-4).

Preparation Example 12

Preparation of Ink (A-5)

The same procedure as in Preparation Example 11 was repeated except that the poly(N-acylalkylene imine)-modified silicone (1) was replaced with the poly(N-acylalkylene imine)-modified silicone (2) obtained in Production Example 3, thereby obtaining an ink (A-5).

Preparation Example 13

Preparation of Ink (A-6)

The same procedure as in Preparation Example 11 was repeated except that the poly(N-acylalkylene imine)-modified silicone (1) was replaced with the poly(N-acylalkylene imine)-modified silicone (3) obtained in Production Example 4, thereby obtaining an ink (A-6).

Preparation Example 14

Preparation of Ink (A-7)

The same procedure as in Preparation Example 11 was repeated except that the aqueous solution of the cationic polymer (2) obtained in Production Example 6 was used in an amount of 8 parts (in terms of effective ingredient), thereby obtaining an ink (A-7).

Preparation Example 15

Preparation of Comparative Ink (a-7)

The same procedure as in Preparation Example 11 was repeated except that the poly(N-acylalkylene imine)-modified silicone (1) was replaced with a polyethylene glycol-modified silicone "KF353" (tradename, HLB10) available from Shin-Etsu Silicone K.K., thereby obtaining a comparative ink (a-7). Meanwhile, the polyethylene glycol-modified silicone was added in such an amount that an amount of the effective ingredient thereof was the same as the amount of the poly(N-acylalkylene imine)-modified silicone (3 parts).

Preparation Example 16

Preparation of Comparative Ink (a-8)

The same procedure as in Preparation Example 11 was repeated except that the poly(N-acylalkylene imine)-modified silicone (1) was replaced with a polyethylene glycol-modified silicone "KF354L" (tradename, HLB16) available from Shin-Etsu Silicone K.K., thereby obtaining a comparative ink (a-8).

Production Example 7

Synthesis of Poly(N-Acylalkylene Imine)-Modified Silicone (4)

A solution prepared by dissolving 12.85 parts of diethyl sulfate and 54.89 parts of 2-ethyl-2-oxazoline in 137.53 parts of ethyl acetate was heated under reflux in a nitrogen atmosphere for 4 h to obtain a terminal-reactive poly(N-propionylethylene imine). Then, a solution prepared by dissolving 200 parts of polydimethyl siloxane having primary aminopropyl-modified side chains (weight-average molecular weight: 30,000; amine equivalent: 2000 g/mol) in 400 parts of ethyl acetate was added at one time to the resulting reaction solution, and the obtained mixture was heated under reflux for 8 h. The resulting reaction mixture was concentrated under reduced pressure to thereby obtain a poly(N-propionylethylene imine)dimethyl siloxane copolymer (hereinafter referred to as "poly(N-acylalkylene imine)-modified silicone"; weight ratio of segment (x) to segment (y) (segment (x)/segment (y)); 75/25) in the form of a light-yellow rubber-like solid. The weight-average molecular weight of the poly(N-acylalkylene imine)-modified silicone was 40,000.

Ten grams of the thus obtained light-yellow rubber-like solid were dissolved in 100 g of ethanol, and 50 g of ion-exchanged water were further added to the resulting solution, and a whole amount of ethanol and a part of water were removed by distillation from the obtained solution using a rotary evaporator and substituted with the ion-exchanged water. Further, the concentration of the reaction solution was controlled by adding ion-exchanged water thereto, thereby obtaining 50 g of a water dispersion of a poly(N-acylalkylene imine)-modified silicone (4) (effective ingredient: 20%).

Preparation Example 17

Preparation of Ink (A-8)

The same procedure as in Preparation Example 11 was repeated except that the poly(N-acylalkylene imine)-modified silicone (1) was replaced with the poly(N-acylalkylene imine)-modified silicone (4) obtained in Production Example 7 and the aqueous solution of the cationic polymer (2) obtained in Production Example 6 was used in an amount of 8 parts (in terms of effective ingredient), thereby obtaining an ink (A-8).

Example 4

Ink-Jet Printing (1) Application of Ink (A-4) by Ink-Jetting

The ink (A-4) obtained in Preparation Example 11 was filled into an ink inlet port disposed above a black head of the same ink-jet printer "EM-930C" as used in Comparative Example 1 through a silicone tube. Next, a solid image printing pattern (size: 204 mm in width×275 mm in length) was prepared using "Photoshop", and an applied and printed on the same plain paper "Nip55" as used in Comparative Example 1 such that the amount of the ink ejected onto the paper was 14±2 g/m$^2$, and the paper with the thus printed pattern image was allowed to stand at a temperature of 20° C. and a relative humidity of 35% for 6 h. The amount of the ink ejected was determined by measuring the change in weight of a screw tube filled with the ink.

(2) Printing with Water-Based Ink (B)

Next, a 100% duty solid image and a 10% duty solid image were printed with the water-based ink (B) on a plain paper in the same manner as in Comparative Example 1(2). In addition, the character "轟" was printed on the plain paper to which the ink (A-4) was previously applied. The results are shown in Table 3.

Examples 5 to 8 and Comparative Examples 7 and 8

The same ink-jet printing procedure as in Example 4 was repeated except that the ink (A-4) was replaced with the inks (A-5) to (A-8) and the comparative inks (a-7) and (a-8), respectively. The evaluation results are shown in Table 3.

TABLE 3

|  |  |  | Examples | | | | | Comparative Examples | |
|---|---|---|---|---|---|---|---|---|---|
|  |  |  | 4 | 5 | 6 | 7 | 8 | 7 | 8 |
| Ink (A) | Ink No. |  | Ink (A-4) | Ink (A-5) | Ink (A-6) | Ink (A-7) | Ink (A-8) | Com. ink (a-7) | Com. ink (a-8) |
|  | Modified silicone | Kind | Silicone (1) | Silicone (2) | Silicone (3) | Silicone (1) | Silicone (4) | KF353 | KF354L |
|  |  | Production Example | Production Example 1 | Production Example 3 | Production Example 5 | Production Example 1 | Production Example 7 | — | — |
|  |  | [(x)/(y)] | 40/60 | 51/49 | 88/12 | 40/60 | 75/25 | — | — |
|  |  | Molecular weight | 80000 | 80000 | 110000 | 80000 | 40000 | — | — |
|  |  | Amount compounded (wt %) | 3 | 3 | 3 | 3 | 3 | 3 | 3 |
|  | Cationic polymer | Kind | Polymer (2) | Polymer (2) | Polymer (2) | Polymer (2) | Polymer (2) | Polymer (2) | Polymer (2) |
|  |  | Production Example | Production Example 6 | Production Example 6 | Production Example 6 | Production Example 6 | Production Example 6 | Production Example 6 | Production Example 6 |
|  |  | Molecular weight | 1800 | 1800 | 1800 | 1800 | 1800 | 1800 | 1800 |
|  |  | Amount compounded (wt %) | 4 | 4 | 4 | 8 | 8 | 4 | 4 |
|  | Properties | Surface tension (mN/m) | 45 | 45 | 45 | 45 | 28 | 28 | 32 |
|  |  | Method of applying ink (A) | Ink-jetting | Ink-jetting | Ink-jetting | Ink-jetting | Ink-jetting | Ink-jetting | Ink-jetting |
| Ink (B) | Anionic colorant |  | Polymer particles | Polymer particles | Polymer particles | Polymer particles | Polymer particles | Polymer particles | Polymer particles |
| Evaluation | Optical density |  | 1.25 | 1.30 | 1.20 | 1.35 | 1.30 | 0.93 | 0.92 |
|  | Roundness of ink dots |  | A | A | A | A | B | C | C |
|  | Image clarity |  | A | A | A | A | B | C | C |
|  | Strike-through |  | 0.25 | 0.20 | 0.15 | 0.17 | 0.18 | 0.30 | 0.30 |

Preparation Example 18

Preparation of Ink (A-9)

A 100 mL beaker was charged with 8 g of the cationic polymer (1) in terms of a solid content thereof, 3 g of the poly(N-acylalkylene imine)-modified silicone (3) in terms of a solid content thereof, 15 g of "Polyethylene Glycol 600" and 5 g of glycerol, and then ion-exchanged water was further added to the beaker such that a total amount of the resulting mixture was 100 g. The contents of the beaker were stirred for 10 min, thereby obtaining an ink (A-9).

Preparation Example 19

Preparation of Comparative Ink (a-9)

The same procedure as in Preparation Example 18 was repeated except that the poly(N-acylalkylene imine)-modified silicone (3) was replaced with ion-exchanged water, thereby obtaining a comparative ink (a-9).

Example 9

Ink-Jet Printing (1) Cast Coating of Ink (A-9)

The ink (A-9) was applied onto a glass plate using a wire coater such that a coating amount of the ink (A-9) was 25 g/m², thereby forming a cast coating film on the glass plate. Next, a plain paper (copying paper; size: 12.5 cm in width×25 cm in length) was overlapped on the thus formed cast coating film. The plain paper was further covered with a filter paper of 100 g/m², and a roll (diameter: 200 mm; width: 200 mm; linear pressure: 230 g/cm) was rolled over the filter paper to transfer the cast coating film from the glass plate onto a surface of the plain paper. Next, the cast coating film thus transferred onto the plain paper was dried at 105° C. for 2 min using a mirror-finished surface dryer. These procedures were rapidly performed. The thus dried treated paper was conditioned at a temperature of 23° C. and a humidity of 50% for one day to prepare a recording paper for ink-jet printing. Meanwhile, the value of the coating amount of the ink as shown in the table was confirmed from the change in weight of the paper between before and after the treatment.

(2) Printing with Water-Based Ink (B)

Next, solid images with 100% duty and 10% duty were printed on a plain paper using the water-based ink (B) obtained in Preparation Example 2 in the same manner as in Comparative Example 1(2). In addition, the character "蠱" was printed on a plain paper to which the comparative ink (A-9) was previously applied. The evaluation results are shown in Table 4.

Comparative Example 9

The same ink-jet printing procedure as in Example 9 was repeated except that the ink (A-9) was replaced with the comparative ink (a-9). The evaluation results are shown in Table 4.

Comparative Example 10

The same ink-jet printing procedure as in Example 9 was repeated except that no treatment with the ink (A-9) was carried out. The evaluation results are shown in Table 4.

TABLE 4

| | | | Example 9 | Comparative Example 9 | Comparative Example 10 |
|---|---|---|---|---|---|
| Ink (A) | Treating solution No. | | Ink (A-9) | Comparative ink (a-9) | — |
| | Modified silicone | Kind | Silicone (2) | None | — |
| | | Production Example | Production Example 3 | — | — |
| | | [(x)/(y)] | 51/49 | — | — |
| | | Molecular weight | 80000 | — | — |
| | | Amount compounded (wt %) | 3 | — | — |
| | Cationic polymer | Kind | Polymer (1) | Polymer (1) | — |
| | | Production Example | Production Example 5 | Production Example 5 | — |
| | | Molecular weight | 5000 | 5000 | — |
| | | Amount compounded (wt %) | 8 | 8 | — |
| | Properties | Surface tension (mN/m) | 45 | 45 | — |
| | Method of applying ink (A) | | Cast coating | Cast coating | — |
| Ink (B) | Anionic colorant | | Polymer particles | Polymer particles | Polymer particles |
| Evaluation | Optical density | | 1.38 | 1.24 | 0.98 |
| | Roundness of ink dots | | A | C | D |
| | Image clarity | | A | C | D |
| | Strike-through | | 0.13 | 0.21 | 0.25 |

From Tables 1 to 4, it was recognized that in the case where the paper to which the ink (A) was previously applied was subjected to ink-jet printing as described in Examples, the resulting printed images had a high optical density, a high roundness of ink dots, an excellent image clarity, and a high image quality with less occurrence of strike-through as compared to those obtained in Comparative Examples in which the inks other than the ink (A) were used or no ink (A) was used.

INDUSTRIAL APPLICABILITY

In accordance with the present invention, there are provided an ink-jet printing method in which even when printed on a plain paper, the resulting printed images have a high optical density while forming ink dots having a round shape, and can exhibit an excellent image clarity and a high image quality with less occurrence of strike-through, as well as a recording paper for ink-jet printing and a water-based ink set used in the ink-jet printing method.

The invention claimed is:

1. An ink jet printing method comprising the steps of:
    applying an ink (A) having a static surface tension of from 35 to 70 mN/m and containing a poly(N-acylalkylene imine)-modified silicone and a cationic polymer onto a recording medium; and
    then applying by ink jet printing, a water-based ink (B) onto the recording medium;
    wherein the cationic polymer has a quaternary ammonium salt group and the cationic polymer is one or more cationic polymers selected from the group consisting of poly(diallyldimethyl ammonium salt) and poly(methacryloyloxyethyl trimethyl ammonium salt), and
    wherein the content of the cationic polymer in the ink (A) is from 4 to 9% by weight.

2. The ink-jet printing method according to claim 1, wherein the poly(N-acylalkylene imine)-modified silicone is an organopolysiloxane formed by bonding a poly(N-acylalkylene imine) segment (y) constituted from a repeating unit represented by the following general formula (1) to at least one silicon atom of an organopolysiloxane segment (x) through a hetero atom-containing alkylene group:

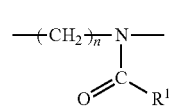

(1)

wherein $R^1$ is a hydrogen atom, an alkyl group having 1 to 22 carbon atoms, an aryl group having 6 to 22 carbon atoms or an arylalkyl group or alkylaryl group having 7 to 22 carbon atoms; and n is a number of 2 or 3.

3. The ink jet printing method according to claim 1, wherein the poly(N-acylalkylene imine)-modified silicone has a weight-average molecular weight of from 50,000 to 1,000,000.

4. The ink jet printing method according to claim 1, wherein the cationic polymer has a weight-average molecular weight of from 1,500 to 100,000.

5. The ink-jet printing method according to claim 1, wherein the ink (A) contains substantially no colorant.

6. The ink-jet printing method according to claim 1, wherein the water-based ink (B) contains an anionic colorant.

7. The ink jet printing method according to claim 1, wherein the recording medium is dried after applying the ink (A) thereon and before applying a water-based ink (B) thereon.

8. A recording paper for ink-jet printing which is obtainable by applying an ink (A) having a static surface tension of from 35 to 70 mN/m and containing a poly(N-acylalkylene imine)-modified silicone and a cationic polymer onto a recording medium;
    wherein the cationic polymer has a quaternary ammonium salt group and the cationic polymer is one or more cationic polymers selected from the group consisting of poly(diallyldimethyl ammonium salt) and poly(methacryloyloxyethyl trimethyl ammonium salt); and
    wherein the content of the cationic polymer in the ink (A) is from 4 to 9% by weight.

9. A water-based ink set comprising an ink (A) having a static surface tension of from 35 to 70 mN/m and containing a poly(N-acylalkylene imine)-modified silicone and a cationic polymer, and a water-based ink (B) containing an anionic colorant;
    wherein the cationic polymer has a quaternary ammonium salt group and the cationic polymer is one or more cationic polymers selected from the group consisting of poly(diallyldimethyl ammonium salt) and poly(methacryloyloxyethyl trimethyl ammonium salt); and
    wherein the content of the cationic polymer in the ink (A) is from 4 to 9% by weight.

* * * * *